United States Patent Office 3,503,917
Patented Mar. 31, 1970

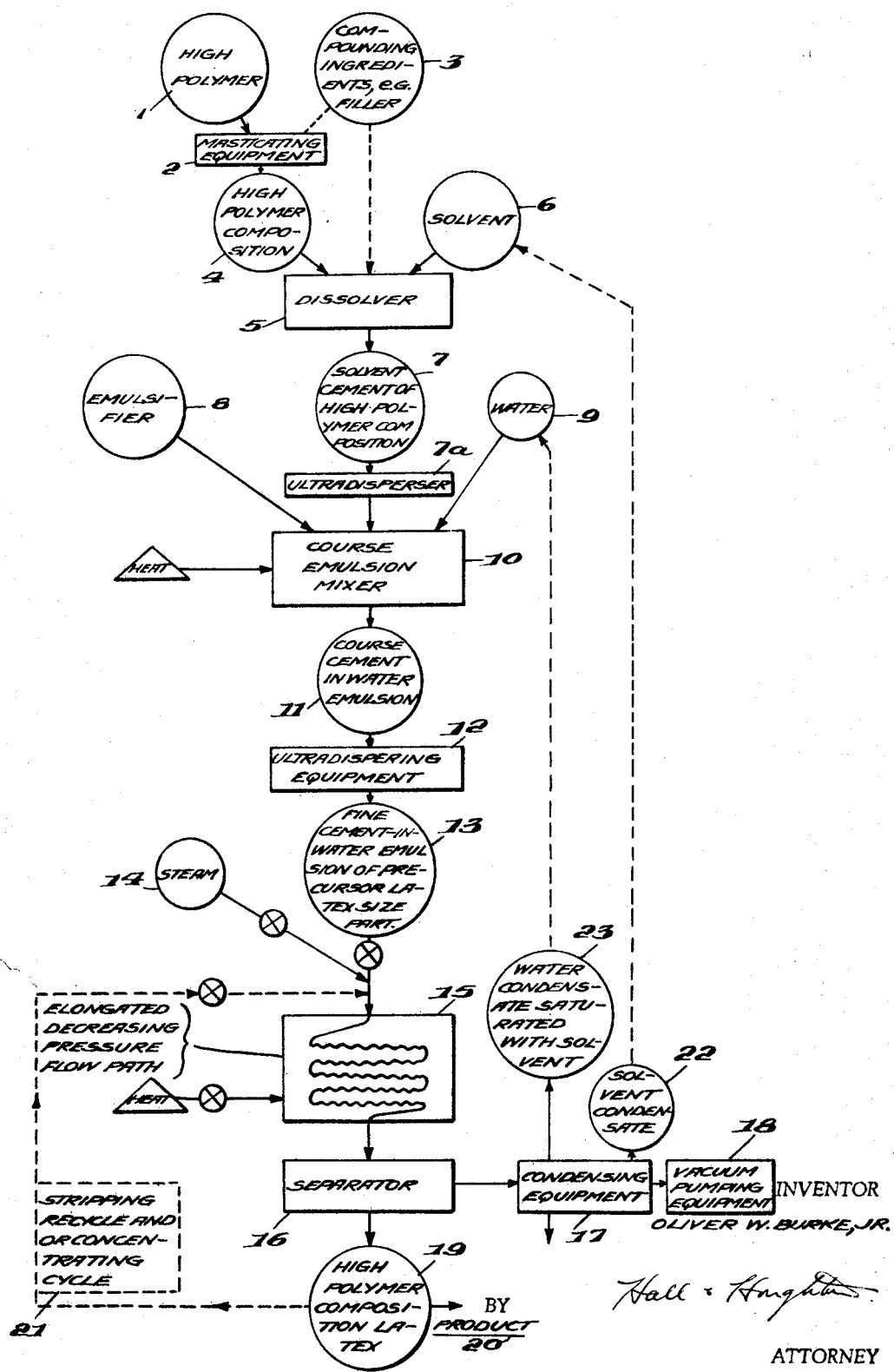

3,503,917
AQUEOUS LATICES OF HIGH POLYMER COM-
POSITIONS AND PROCESSES FOR PRODUC-
ING SAME
Oliver W. Burke, Jr., Fort Lauderdale, Fla.
(P.O. Box 1266, Pompano Beach, Fla. 33061)
Filed Mar. 9, 1967, Ser. No. 621,997
Int. Cl. C08d 7/00, 7/18
U.S. Cl. 260—29.6            20 Claims

ABSTRACT OF THE DISCLOSURE

The preparation of aqueous latices from solvent dispersions of elastomers and other high polymer compositions has presented problems including foaming and coagulation which have produce losses and increased costs. Herein combinations of steps are disclosed which reduce or eliminate various of these problems; enable the preparation of latices from high solids, high viscosity cements; enable preparation of latices of filler extended and filler reinforced elastomers; and enable the preparation of latices both dilute and of high solids continent, which are useful for example for adhesive and film forming purposes.

BACKGROUND OF THE INVENTION

Field of the invention

This invention relates to the production of aqueous latices from solvent dispersions of high polymer compositions and aims generally to provide new combinations of steps for improving the same and new products produced thereby.

Description of the prior art

To date, in the practical art, synthetic latices of high polymers have been primarily prepared by emulsion polymerization, and such practice has not been applicable to high polymers made by essentially anhydrous catalyst polymerizations. It has been proposed to prepare aqueous latices of high polymers from solvent solutions thereof by processes of the type which comprise the general steps of (1) providing a dispersion or cement of the polymer in a volatile organic solvent for the polymer, (2) adding to such dispersion water and an aqueous emulsifier therefor and emulsifying the same to produce an emulsion, (3) stripping the volatile organic solvent from the said emulsion, and (4) recovering the resulting latex product. However, in the practical art difficulty has been experienced in attempting to render such proposed processes commercially feasible, inter alia, in that (1) solvent dispersions or cements of the high polymer materials, unless quite dilute, have high viscosities, which have rendered it impractical to produce raw emulsion particles of precursor latex particle size from such dispersions when their viscosities have been over 1000 to 7000 centipoises; and when dilute, require the use of undesirably high quantities of emulsifier and the stripping of undesirably large quantities of solvent; (2) in that the emulsions have tended to foam excessively during stripping; (3) in that the emulsions have tended to form coagulum by drying out especially on contact with heated surfaces, during the stripping and/or concentrating processes; and (4) in that all of these problems are accentuated as the aqueous content of the emulsion is reduced.

SUMMARY OF THE INVENTION

By the present invention conditions are created combinations of which alleviate the aforesaid problems and render practical the production of aqueous latices from solvent dispersions of high polymer compositions. These conditions, inter alia, include, severally and in cooperating combinations:

(1) The use of particular solvents for the polymers which are essentially immiscible with water in liquid phase, and which have boiling points less than the boiling point of water at atmospheric pressure, or which form azeotopes with water which have boiling points less than the boiling point of water at atmospheric pressure, and preferably solvents which have boiling points higher than that of water but which form azeotropes with water that have boiling points lower than that of water, which preferred group comprises especially the aromatic solvents including toluene, the xylenes, ethyl benzene, cumene, etc.

(2) The formation of relatively high solids cements of the high polymer composition and the solvent therefor selected as aforesaid, which preferably have viscosities of over 1000 centipoises and more preferably over 7,000 to 10,000 centipoises, and most preferably over 20,000 centipoises, which high viscosities can be tolerated because of other cooperating steps of the process.

(3) The employment, to reduce the preferred cements to particles of precursor latex size in the presence of the aqueous phase and emulsifier, of a dispersing device combining mechanical, hydraulic, and ultrasonic shear, impact, and vibrating phenomena, which this invention has shown to effect such reduction notwithstanding that such cements may have very high viscosities of up to 20,000 centipoises or higher, and notwithstanding that such cements may have their viscosities increased by the incorporation of fillers, so that they will be contained within the precursor latex particles themselves for producing better reinforcement, as is contemplated in certain embodiments of the present invention. The said conditions thus enable the quantities of emulsifier and solvent to be kept relatively low while simultaneously providing precursor latex size particles facilitating the removal of solvent therefrom.

(4) The introduction of the oil-in-water emulsion formed as aforesaid, as a discontinuous phase, into a flow of gas comprising essentially steam as an initial continuous phase, followed by subjecting the two phases together to a decreasing pressure gradient, while maintaining the temperature of both phases within the limited range for stability of the emulsion, thereby vaporizing solvent from the precursor latex sized particles while maintaining their stability, until substantially all the solvent is contained in the gaseous continuous phase, and separating the resulting particles of latex from the gaseous continuous phase; (a) the decreasing pressure and separation preferably being effected by passing the two phases turbulently or tortuously through means defining an elongated path to a separator, and passing the gaseous continuous phase from the separator to a condensing system from which non-condensibles are pumped by any suitable vacuum pumping means; (b) the temperature of the two phases being maintained, during the stripping, within the limited range for stability of the emulsion, preferably by controlling the initial continuous phase in temperature essentially to not exceed the limiting temperature for stability of the emulsion and in quantity to be sufficient to effect the stripping of the solvent, and by controlling the temperature and quantity of the emulsion being dispersed therein; (c) the delivery of substantially all of the solvent to the gaseous continuous phase being essentially effected preferably in a single pass by appropriate design of the capacity of the apparatus, but when it is desired to employ apparatus of more limited capacity, being achieved in part in a first pass through the stripping apparatus and being completed by an additional pass or passes of the partially stripped material through the same equipment, i.e. by a recycle, and; (d) the flow of gas comprising steam as the initial continuum preferably consisting entirely of steam expanded, when it first contacts the emulsion, to sub-atmospheric pressure and to a temperature not detrimental to the latter, where any substantial quantity of solvent is being stripped from the precursor latex sized particles, but, under conditions where it is desired to augment the volume or velocity of the initial continuum, being augmentable by including a minor proportion of non-condensible gas or of the solvent in the said flow of gas, for which purpose a minor proportion of the effluent gas phase from the separator, or the azeotrope remaining in said gas phase after condensation of unazeotroped water vapor therefrom, may be recycled to constitute a part of the initial continuum.

(5) The latex delivered to the separator from the stripping step is a stable latex suitable for any use for which its solids content adapts it. It is also at a temperature within the limited ranged for stability of the emulsion and the invention further contemplates that this separated latex, preferably without cooling, may be recycled through the elongated path to remove the last traces of solvent if desired, and particularly to concentrate the latex by removing water therefrom, when a product of higher solids content is desired; and it being preferred, when concentrating, to reduce, and where the temperature range for stability of the latex permits this to even cut off, the supply of initial continuous phase, e.g. the steam to the elongated path and to supply external heat through the walls defining the elongated path to vaporize water from the latex to form the continuous phase into which further water vapor enters as the concentration of the latex progresses; the temperature at which the heat is supplied through the walls being maintained at a value which does not overheat any part of the latex, but which enables it to remain within the limits of temperature in which it is stable, thereby avoiding the formation of undesired coagulum. The concentrated latex effluent as a discontinuous phase from the elongated path with the evolved vapor as a continuous phase, may again be separated in the separator, the continuous phase passing to the condensing equipment, and any uncondensibles again passing therefrom to the vacuum pumping equipment.

(6) While for economy of equipment it is preferred to employ the same elongated path, with adjustment of appurtenant equipment as above described, for effecting both the stripping and the concentration, the length of elongated path may be adjusted to the vaporization load to be served, and when it is desired to concentrate the stripped latex without suspending the stripping operation of the equipment, one or more separate elongated paths may be provided for this purpose, which may terminate in the same or different separator equipment. The desired concentration may be effected in a single pass, or, if desired, in a plurality of recycles through the same or different concentrating paths.

(7) The water recovered in the condensing equipment is distilled water saturated with the stripped solvent, and in accordance with the present invention it is preferred to recycle this recovered water for use in preparing the emulsion of the precursor latex sized particles of solvent solution of the high polymer composition.

The objects of the invention, severally and interdependently, are to provide new process features and new combinations of steps, which contribute to produce an improved process and which enable the production of new latices which may contain not only polymers and compounding ingredients such as fillers, but which is preferred embodiments may contain such compounding ingredients, e.g. reinforcing fillers, within the high polymer latex parcles. Other objects and advantages of the invention will be apparent from the above general description and the following more particular descriptions of preferred embodiments thereof, which, however, are illustrative, but not restrictive of the invention, the scope of which is more particularly pointed out in the appended claims.

BRIEF DESCRIPTION OF THE DRAWING

In the accompanying drawing: the figure is a flow sheet or diagram illustrating the sequences of steps and flow of materials in typical embodiments of process according to the invention.

DESCRIPTION OF PREFERRED EMBODIMENTS

(a) In general

In the preferred embodiments illustrated in the figure, the high polymer 1, e.g. elastomer and/or plastomer material as hereinafter described, is prepared as a high polymer composition 4 for conversion to a cement by working in an appropriate masticating equipment 2, such as a rubber mill, Banbury, or the like. In accordance with one embodiment of the invention provision is made for incorporating one or more high polymer compounding ingredients 3, e.g. rubber reinforcing filler, into the high polymer composition in such a way that the ingredients 3 are thereafter contained within the polymer particles of the latex being formed, for which purpose the said ingredient or ingredients 3 are worked into the high polymer 1 by working therewith in the masticating equipment 2. By such procedure the high polymer ingredients may become fixed to the compounding ingredient, i.e. the polymer particles can become reinforced by the fillers, and in effect become so intimately attached thereto, or embrasive thereof, as to retain the same when dispersed as a cement. In the case of compounding ingredients desired to be incorporated in the latex particles, but not requiring working with the high polymer itself, the ingredients 3 may be fed into the cement forming equipment or dissolver 5 independently of the high polymer composition 4, as is also indicated in the figure.

In the cement forming equipment or mixer or dissolver 5, the high polymer composition 4 is combined and preferably stirred or otherwise worked with solvent 6 appropriate for the high polymer and for the process, as further described herein, to form a solvent cement 7 of the high polymer composition 4 and of any extraneously added compounding ingredients 3, the adequate dispersion of which in the cement requires considerable working, and may even be accomplished by the passage of the cement through an ultradispersing equipment 7a, e.g. of the same type as the equipment 12 hereinafter described.

The solvent cement 7 is then combined with emulsifier 8 appropriate for the high polymer and the process, and with water 9 in a course emulsion mixing equipment 10 where the ingredients are mixed to form a course cement in water emulsion 11, which is then passed to an ultradispersing equipment 12, preferably of the type hereinafter described, which breaks up the relatively large particles of solvent-cement forming the discontinuous phase in the course emulsion 11 into particles of such small size that they will be of stable latex particle size when relieved of their solvent content, and preferably near the upper limit of such size.

The resulting fine cement-in-water emulsion of precursor latex size particles 13 is then stripped of its solvent content without excessive foaming and while avoiding formation of coalgulum. In accordance with the present invention it has been found that these results may be best accomplished by providing a flow of steam 14 as an initial continuous phase and introducing the oil-in-water emulsion of precursor latex sized particles 13 as a discontinuous phase into the flow of steam 14 as the initial continuous phase, and thereafter subjecting the two phase to decreasing pressure, while passing them turbulently or tortuously through an elongated decreasing pressure flow path 15 and while maintaining the temperatures of the flows within the limited range for stability of the emulsion 13, thereby vaporizing solvent from the precursor latex sized particles of the discontinuous phase until substantially all the solvent is contained in the gaseous continuous phase, and then separating the resulting particles of latex from the gaseous continuous phase with essentially no sudden drop in pressure prior to such separation. This end is attained by delivering the flows from the elongated turbulent flow path 15 through an essentially unrestricted outlet into a separator 16, from the lower part of which the latex is drawn, and from an upper part of which the continuous phase is passed to condensing equipment 17 maintained under vacuum, preferably a vacuum of the order of 28 to 29 inches of mercury, by withdrawal of uncondensed gasses therefrom by vacuum pumping equipment 18, e.g. a steam jet.

The high polymer composition latex 19 withdrawn from the separator 16 may be delivered as product 20, or may be recycled as indicated at 21 and be again fed as discontinuous phase through the elongated flow path 15 for removal of residual solvent therefrom as above noted, either separately or concurrently with additional emulsion 13 as is indicated by the valve symbols between 13 and 15 and between 21 and 15 in the figure; or it may be cycled through the same or a different elongated path 15 for concentrating the latex, in which event the latex is heated to evaporate water therefrom under sub-atmospheric pressure at temperatures within the limited temperature range for its stability, externally to the path 15 from the valved heat source shown connected to 15, while the supply of steam internally of the path from the valved source 14 is reduced or cut off as aforesaid. When such concentrating step has been employed, the product 20 resulting therefrom will be a latex of increased solids content.

(b) The high polymer material 1

The new process is applicable to the preparation of latices from a solvent solutions of high polymer material generally, and is especially applicable to those solvent soluble, water insoluble elastomers and plastomers which, with or without plasticiser, have properties adapting their latices for use as adhesives, binders, film forming materials, coating materials, etc. Examples of such elastomers and plastomers, illustrative but not restrictive of those to which the invention can be applied, are as follows: butyl rubber, polybutadiene, polyisoprene, polyethylene, polypropylene, ethylene-propylene polymer, ethylene - propylene-diene terpolymer, butadiene-styrene copolymer, butadiene-ethylene copolymers, propylene-butene-1-copolymers, nitrile rubber, natural rubber, any of the foregoing polymers grafted with polar or other polymer grafts, as for example, those set forth in British Patent No. 878,150 to Burke, published Sept. 27, 1961, and solvent soluble mixed plastomers and elastomers, e.g. butadiene - styrene-terpolymers with styrene copolymer resins including graft polymers thereof, as for example, those set forth in Hayes U.S. Patent No. 2,802,808.

(c) Compounding ingredients 3

The compounding ingredients 3 which are especially contemplated in the prevent invention are the solid, particulate, compounding ingredients which are insoluble in the solvents 6, namely: fillers, including rubber reinforcing fillers, pigments, etc., which by the present invention may be incorporated into the polymer composition particles of the latices, rather than merely in the water phases thereof. The solid particulate compounding ingredients of this class comprise those set forth on pp. 278 to 345 of "Compounding Ingredients for Rubber," 3rd ed. (1961) published by Rubber World, New York, N.Y., herein incorporated by reference, and on pp. 146 to 217 of "British Compounding Ingredients for Rubber" by Brian J. Wilson (1958) published by W. Heffer & Sons, Ltd., Cambridge, England, herein incorporated by reference. These ingredients thus include but are not limited to carbon black, talc, mica, lithopone, aluminum silicate, calcium silicate, silica, calcium carbonate, calcium sulfate, asbestos, organic pigments, inorganic pigments, and insoluble organic fillers including vinylic fillers and vinylic pigments. The insoluble organic fillers are described in British Patent No. 799,043 to Burke published July 30, 1958 and in chapter 15 entitled "Reinforcement of Rubber by Organic Fillers" in the treatise "Reinforcement of Elastomers" edited by Gerard Kraus (1965) published by International Publishers, New York, N.Y., herein incorporated by reference.

(d) The emulsifiers 8

The invention is not dependent on the use of any particular emulsifier combination, and may be practiced with any selected emulsified or emulsifier combination suitable for aqueously emulsifying the non-aqueous solutions of high polymer materials concerned. As will be evident to those skilled in the art such selections may be made from the anionic, cationic and non-ionic emulsifiers suitable for emulsifying water with non-aqueous solutions of high polymer materials, examples of which are set forth in the "Fourth Revision of Synthetic Detergents and Emulsifiers" by John W. McCutcheon, published in soap and chemical specialties December 1957, January, February and March 1958. About 10 percent by weight of emulsifier based on high polymer material content of the cement in practically all instances suffices and in most instances 5 to 6 or less percent by weight of emulsifier based on high polymer material content of the cement is sufficient, because the present process minimizes the amount of emulsifier required.

The anionic emulsifiers include but are not limited to emulsifiers which are alkali metal salts of fatty acids, partially hydrogenated fatty acids, rosin acids, disproportionated rosin acids, alkyl sulfates, aryl and alkaryl sulfonates, and emulsifiers having the general formula: $R(OCH_2CH_2)_nOSO_3X$ wherein R is aliphatic, aryl, alkaryl or cyclic, $n$ is 1 to 9, and X is a monovalent metal or radical and, for example the sodium and ammonium salts of sulfated nonylphenoxypoly(ethylenoxy)ethanol (e.g. the trademarked products Alipal CO–433 and Alipal CO–436).

The cationic emulsifiers include, but are not limited to, the class of emulsifiers which are acid salts of primary secondary, and tertiary amines and the quaternary ammonium type emulsifiers, e.g., the alkyl polyoxyethylene amines (Katapol PN–430, a trademark product) and the like.

Non-ionic emulsifiers can be selected from the class of emulsifiers which are alkyl polyoxyethylene ethers and alcohols, polyethylene ethers and alcohols, e.g., polyoxyethylene lauryl ethers, polyethylene lauryl alcohol e.g., Brij-35 and Igepal-430 (trademark products); and polyethylated fatty alcohols e.g., Emulphor ON or ON–870 (trademark products). Other non-ionic emulsifiers include those which are polyoxyalkenated alkyl phenols or alcohols having the formula $R(OCHR_1CHR_1)_nOH$ where R is an alkyl, aryl or alkaryl group, $R_1$ is an alkyl group or hydrogen and $n$ is an integer of 4 to 8 to 10 or even higher. Compounds of this type are prepared by condensing an alkyl phenol or an alcohol with ethylene oxide or propylene oxide.

As will also be understood by those skilled in the art, combination of anionic and non-ionic emulsifier can be employed as well as combinations of cationic and non-ionic emulsifiers. An effective emulsifier combination may comprise 10 parts of a non-ionic emulsifier, e.g. polyoxyethylated octyl phenol containing 8 to 10 ethylene oxide units, and known under the trade name of Triton X-100, with one part of an anionic emulsifier, e.g. sodium lauryl sulfate.

The quantity of emulsifier employed in this invention is in the range of 2% to 20% by weight and preferably 5% to 10% by weight based on the high polymer composition; and if desired, small additions of electrolyte may be made to the latex or in preparing the course or fine emulsion, as, for example, in accordance with the practices referred to in U.S. Patents Nos. 2,955,094 issued Oct. 4, 1960 and 3,222,311, issued Dec. 4, 1965, to Esso Research and Engineering Company, as assignee of R. S. Brodkey et al., and A. L. Miller et al.

(e) Equipment

Homogenizer.—While the invention in its broader aspect is not limited to any particular homogenizer, the invention has discovered that the type of homogenizer disclosed in Mould Patent No. 3,195,867* as suitable for low viscosity materials such as milk, oil, fruit slurries, etc. is especially effective for use as an ultra-disperser of aqueous emlusions of highly viscous solutions of high molecular weight polymer compositions.

Elongated path progressive stripping and concentrating means.—The stripping and concentrating operations of the process may be practiced with any suitable apparatus which provides an elongated path for turbulent or tortuous flow of the material being stripped or concentrated, as a discontinuous phase, and for vapor as a fluid driving continuous phase, with a gradual decrease in pressure as the two phases progress along the path, the turbulence being such as to continually break-up and re-form the discontinuous phase, thus causing vapors to pass therefrom into the continuous phase without excessive foaming and while maintaining the temperature of the two phases within the limited range for stability of the oil-in-water emulsion concerned. While a number of types of apparatus are adaptable for the purpose, an effective and possibly the most compact arrangement is afforded by a heat exchanger of the corrugated plate type, arranged with the spaces between adjacent pairs of plates connected in series to afford the elongated tortuous path terminating in an evacuated separator device, and with provision for supplying steam internally of the path as an initial continuous phase especially for the stripping operation, and with provision for supplying heat externally of the path, especially for the concentrating operation.

Separating, condensing, and evacuating apparatus.—As will be apparent to those skiled in the art the invention is not dependent on the use of any particular type of separating, condensing and evacuating apparatus. Conveniently, when stripping azeotroping solvent, as a separator may be used a vertical cylindrical receiver, with a downwardly tapering bottom leading to a discharge opening connected to a positive displacement pump for removal of separated latex therefrom without breaking the vacuum, with a tangential side opening for passage of the two flows thereinto, and with a top opening for the discharge of the continuous phase to the condensing equipment. The latter conveniently may comprise two condensers, one for non-azeotroped water, and the other operating at a lower temperature for azeotrope of water and solvent. The evacuating apparatus conveniently may comprise a steam jet evacuation equipment connected to draw non-condensed material from the condenser equipment.

(f) Cement viscosities

While the invention in its broader aspects is not limited to the employment of highly viscous cements, in preferred embodiments great improvement in efficiency is effected by the use of high solids cements in aromatic solvents which have higher viscosities than those heretofore proposed for the preparation of latices, and which can be employed because of the cooperating features of the invention. Typical of cement viscosities which can be employed in this invention are the following butyl rubber cements:

| Butyl Rubber [1] | Solvent | Viscosity at 25° C. (cps.) |
|---|---|---|
| 19% | Toluene | 7,000 |
| 19% | Xylene [2] | 6,500 |
| 21% | Toluene | 11,300 |
| 21% | Xylene [2] | 11,000 |
| 23% | Toluene | 19,000 |
| 23% | Xylene [2] | 17,000 |
| 25% | Toluene | 31,000 |
| 25% | Xylene [2] | 28,000 |

[1] Enjay Type 268.
[2] Mixed xylenes.

As above noted the present invention enables latices to be formed from such high viscosity dispersions of the high polymer compositions and it is accordingly preferred to use such solutions of at least 10,000 centipoises viscosity at room temperature, and preferably of above 20,000 centipoises at room temperature.

(g) Employment of other concentrating steps

In the process as generally described under (a) above, it has been pointed out that the dilute latex resulting from the stripping step may be concentrated to a high solids content of over 60% as by repeated passes through the elongated path concentrating means described under (e) above. When desired, the concentration of the latex may be partially accomplished by other concentrating procedures. When the uses for which the product will be employed require a product free of any creaming agent, the dilute latex may be passed directly to the elongated concentrating path, or may be passed thereo after a partial concentration by centrifuging, and the resulting product will then be free of any content of creaming agent. When the uses to which the products will be put permit, the dilute latex may be partially concentrated by creaming, using the creaming agents and procedure set forth at column 7, lines 6 to 56 of Burke et al. U.S. Patent No. 3,278,467, issued Oct. 11, 1966, herein incorporated by reference. As these other concentrating procedures do not involve evaporative concentration, they are herein termed nonevaporative concentrating procedures.

As specific illustration of the practice of the invention by the procedures above described reference may be had to the following examples which are illustrative, but not restrictive, of the invention.

EXAMPLE 1

Preparation of butyl rubber latex

The coarse emulsion for this example was formulated, except for the aromatic solvent toluene, in a manner similar to that used in Example 1 of U.S. Patent No. 2,936,295 granted to Esso Research and Engineering Company assignee of R. S. Brodkey, R. Miller and A. L. Miller, on May 10, 1960.

To a sigma blade mixer was added 80 lbs. of butyl rubber and 320 lbs. of toluene. The mixer was run for twelve hours and a clear cement resulted. The temperature of this cement was raised to 80° C. and the cement was then mixed with 300 lbs. of water also heated to 80° C. and containing 4 lbs. of the sodium salt of nonylphenylether of polyoxyethylenesulfate containing about 4 ethylene oxide units.

The coarse emulsion at 80° C. obtained in the sigma blade mixer was then twice passed through the homogenizing apparatus described for use in blending milk, oil, fruit slurries and the like, in U.S. Patent No. 3,195,867 granted to Harry W. Mould, Jr., July 20, 1965. The homogenizer was fitted with the stator set forth as FIG. 4 of the drawings of the Mould patent, and the machine was operated at 5200 r.p.m. with the aid of a 5 horsepower motor. Thus the homogenizer used in this example, as disclosed in the Mould patent incorporated by reference hereinabove, comprised a housing, a plurality of an- ---
* Herein incorporated by reference.

nular elements mounted in said housing in coaxial, radially-spaced relation, one of two radially adjacent elements having a plurality of apertures therethrough spaced from one another axially, the other of said two elements having a plurality of circumferentially spaced axially-extending slots therethrough, means for effecting relative rotation between said two elements, said housing having inlet and outlet ports at radially opposite sides of said elements for admitting fluid to and exhausting it from said housing, and means for directing incoming fluid successively through said apertures, said slots, and said outlet port, whereby upon relative rotation between said two elements and the passage of fluid through said housing, said apertures in said one element evenly distribute said fluid along the axial length of the radial space between said two elements, and the confronting marginal edges of said apertures and slots, respectively, cooperate to shear the fluid in the radial space between said two elements. The resulting fine cement-in-water emulsion was stable and showed no tendency to oil out, and thus was stable in a range of temperatures including 80° C.

The fine cement-in-water emulsion was then injected, with a stream of steam expanded down to a sub-atmospheric pressure measured as a vacuum of 10 inches of mercury, in the proportion of about one pound of steam per four pounds of the toluene content of the cement, into the elongated decreasing pressure tortuous flow path provided by the series connected spaces between adjacent pairs of plates of a corrugated plate type heat exchanger, no heat being supplied to the intervening spaces between such pairs of plates. The outlet of said heat exchanger was connected through a separator and condension system to a source of vacuum of between 28 and 29 inches of mercury. The cement-in-water emulsion dispersed as a discontinuous phase in the steam as a continuous phase, and both phases were reduced in pressure at an average rate of about ⅓ inch of mercury per foot of path travelled, straight through basis, by a substantially adiabatic expansion which subjected the two phases to decreasing pressure while maintaining the temperature thereof within a range below the 80° C. initial temperature of the phases, i.e. within the limited range for stability of the emulsion. The effluent from the tortuous path entered the separator without restriction, and without detrimental foaming in the separator, and the continuous vapor phase free of any foam was passed to the condensing equipment, where the water in excess of the quantity azeotroped with the solvent was condensed in a first stage the remaining azeotrope being condensed in a second stage and separating into solvent and water layers immediately on condensing. The solvent was substantially all accounted for in the gaseous phase; the separated latex containing about 18% solids, dry basis, containing no observable coagulum or floc, and being useful as a dilute adhesive composition, the yield being essentially quantitative based on the charged solids.

A portion of the so separated latex was then subjected to concentration in the tortuous elongated path. For this purpose the path was maintained as before at a decreasing pressure from its entrance end to about 28 inches of mercury at the separator, and for this concentrating step, the supply of steam as an initial continuum internal of the path was cut down to 0.1 pound per pound of dry solids in the latex, and the path was heated externally by hot water at about 75 to 85° C. passed through the spaces between the pairs of plates, which temperature was within the range for stability of the emulsion. By this procedure water was evaporated from the latex to augment the continuous vapor phase and the two phases were subjected to decreasing pressure in a slow gradient ending at about 28 inches of mercury, at the separator. From the separator the vapor phase which was foam-free was drawn off to the condenser system and the separated latex of increased solids content was pumped back to and recirculated through the elongated path concentrator until the latex attained a solids content of 65% solids, dry basis, without loss of its stability, without appearance of any observable floc, and with essentially quantitative yield based on the charged solids.

EXAMPLE 2

Preparation of ethylene-propylene rubber latex

To a sigma blade mixer were added 75 pounds of ethylene-propylene rubber (Enjay EPR rubber) and 545 pounds of benzene and 130 pounds of mixed xylenes, and after mixing 12 hours a clear rubber cement was obtained. A coarse emulsion was made by combining 375 pounds of this cement with 3.75 pounds of the sodium salt of sulfonated nonylphenoxy-poly(ethyleneoxy)ethanol (dry basis) and 188 pounds of water and the temperature of the emulsion was raised to 80° C. The coarse emulsion was then converted to a fine emulsion by passing same twice through the high shear emulsifier described in Example 1, after which the fine cement of precursor latex sized particles was converted to a stripped latex of about 14% solids content, dry basis, without detrimental forming, and containing no observable floc or coagulum, by the same stripping procedures employed in Example 1. A portion of this stripped latex was then concentrated to a floc-free latex having a solids content of 55%, dry solids basis, by the same concentrating procedure used in Example 1, without detrimental foaming, and without loss of stability of the latex.

EXAMPLE 3

Preparation of a reinforced butyl rubber latex

On a rubber mill there was milled into 40 pounds of butyl rubber 10 pounds of Hi-Sil 233, a silica-type rubber reinforcing pigment. This product was dispersed in 220 pounds of toluene in 12 hours with the aid of a sigma blade mixer. To the resultant cement of high polymer composition was added 3.1 pounds of sodium salt of nonylphenyl ether of polyoxyethylene sulfate having about 4 ethylene oxide units, dry basis, and 208 pounds of water, and the temperature was heated to a temperature of 80° C. and mixed to form a coarse emulsion. The fine cement-in-water emulsion was prepared by passing the coarse emulsion twice through the high shear emulsifier used in Example 1, and was then converted to floc-free stripped dilute latex of about 17% solids content, without detrimental foaming, and to concentrated floc-free latex of about 50% solids content, without detrimental foaming, by procedures like those used in Example 1. The reinforcing silica pigment particles were contained in the rubber particles of the latex where they are most effective as a reinforcing agent.

In this example the hydrated silica pigment may be replaced by an equivalent weight of medium thermal type rubber reinforcing carbon black, e.g. Thermax, and/or other suitable reinforcing fillers; and the anionic emulsifier may be replaced by an equivalent quantity of mixed anionic and non-ionic emulsifiers (e.g. by replacing a third of it with Igepal-430, a reaction product of one mole of nonylphenol and four moles of ethylene oxide) dry basis; or completely by non-ionic emulsifier, e.g. by five pounds of the Igepal-430, dry basis.

EXAMPLE 4

Preparation of latex from grafted butadiene styrene rubber

In a laboratory Banbury 1000 grams of butadiene-styrene copolymer rubber (SBR 1502), 40 grams of 2-vinyl-pyridine, 3 grams of cumene hydroperoxide and 1 gram of tetraethylenepentamine were mixed for 3 minutes at temperatures in excess of 325° F. to cause polar grafting of the rubber. This grafting operation was repeated 4 times and the four batches of grafted product were cooled and dissolved in 16 kilograms of mixed xylenes, with the aid of agitation, over a period of 12 hours. To the grafted SB–R cement was added 240 grams of the potassium salt of coconut oil fatty acids and 20 liters of water and after mixing a coarse emulsion was formed. The coarse emulsion was converted to a fine emulsion of precursor latex sized particles ready for stripping by twice passing through the homogenizing apparatus described in Example 1 hereof. Further treatment by the procedures of Example 1, produced a substantially quantitative yield, dry solids basis, of dilute and concentrated latices of 2-vinyl pyridine grafted butadiene-styrene rubber having excellent adhesive properties.

EXAMPLE 5

Preparation of latex of pigment reinforced cis-1,4-polybutadiene

In the laboratory Banbury was mixed 1000 grams of cis-1,4-polybutadiene and 400 grams of silica pigment (Hi-Sil 233). Four of these batches of Banbury mix were prepared and upon cooling were combined and dissolved in 20 kilograms of benzene containing 400 grams of hydroxyacetic acid salt of dodecylamine to which was added 20 liters of water and the mixture was heated to 80° C. while mixing, and the coarse emulsion so formed was twice passed through the homogenizer described in Example 1 hereof, and the resulting fine emulsion was then stripped and concentrated by procedures essentially similar to those of Example 1. The stripped dilute latex and the concentrated latex were obtained without observable floc or coagulum, in essentially quantitative yield, dry basis, and without detrimental foaming, and contained respectively about 20% and about 50% solids, dry basis.

In place of the 400 grams of cationic emulsifier employed above, a mixture of 300 grams thereof with 100 grams of a non-ionic emulsifier, e.g. the reaction product of one mole of nonyl phenol with four moles of ethylene oxide (commercially available as Igepal-430) with equally satisfactory results may be used.

EXAMPLE 6

Preparation of a latex of vinylic filler reinforced natural rubber

In the manner described for Example IV-2, p. 12 of British Patent No. 799,043, there was prepared 20 pounds of a vinylic filler composed of acrylonitrile and ethylene glycoldimethacrylate in the ratio of 95 to 5, which was incorporated into natural rubber latex containing 100 pounds of rubber dry basis and 2 pounds of 2,6-di-tert-butyl-4-methylphenol and the mixture coagulated with the aid of a coagulating solution containing 5% sodium chloride and 5% sulfuric acid and the product was dried at 80° C. in a forced draft oven. The dried natural rubber vinylic filler masterbatch was now milled on a rubber mill and sheeted out.

To 100 pounds of the thin sheeted masterbatch in a sigma blade mixer was added 5 pounds of hydroxyacetic acid and 350 pounds of toluene and after 12 hours of mixing a smooth flowing cement resulted. To the cement was added 3.3 pounds of potassium hydroxide and 10 pounds of the potassium salt of disproportionated rosin acid and 350 pounds of water and mixed to form a coarse emulsion which was twice passed through the homogenizer described in Example 1 hereof, and then stripped and concentrated by the procedures described in Example 1. The stripped dilute latex of vinylic filler reinforced natural rubber, having the filler in the rubber particles, rather than as separate particles in the latex, contained about 20% solids, dry basis, and the concentrated latex contained about 50% solids, dry basis, and both were obtained without detrimental foaming and essentially in quantitative yield.

In this example the vinylic filler may be replaced by other filler materials in whole or in part, or may be omitted for preparing a latex from coagulated natural rubber with selected emulsifier.

While there have been described herein what are at present considered preferred embodiments of the invention, it will be obvious to those skilled in the art that modifications and changes may be made without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:
1. In the formation of a latex from a solvent dispersion of higher polymer composition, by a process of the type which comprises:
   (1) providing a dispersion of the polymer composition in essentially water-immiscible volatile solvent,
   (2) adding water and emulsifier to said dispersion and emulsifying the same,
   (3) stripping the solvent from the emulsion, and
   (4) recovering the resulting latex product, and in which
   (5) the formation of foam is suppressed by subdividing the emulsion being stripped of volatile solvent in discontinuous phase with a moving body of vapor as the continuous phase while subjecting both phases to a decrease of pressure to vaporize the solvent, the improvement which consists in the combination in the process of:
   (6) forming the solvent dispersion of the polymer composition with solvent which itself or as an azeotrope with water has a boiling point lower than that of water at atmospheric pressure,
   (7) adding to the so formed solvent dispersion water and emulsifier in proportions to form an oil-in-water emulsion and emulsifying the same so that the discontinuous phase thereof is in particles of precursor latex size,
   (8) providing a moving flow of gas comprising steam as the initial continuous phase,
   (9) introducing the oil-in-water emulsion of precursor latex size particles as a discontinuous phase into the flow provided as the initial continuous phase and thereafter subjecting both phases to the decrease of pressure referred to in step (5) while maintaining the temperature thereof within the limited range for stability of the emulsion, thereby vaporizing solvent from the precursor latex sized particles until substantially all the solvent is contained in the gaseous continuous phase, and
   (10) separating the resulting particles of latex from the gaseous continuous phase.

2. An improvement as claimed in claim 1, wherein in step (9) no heat is added while the pressure is decreasing.

3. An improvement as claimed in claim 1, in which the oil-in-water emulsion prepared in step (7) is preheated to a temperature between 50° C. and the limiting temperature for stability of the emulsion before being subjected to step (9).

4. An improvement as claimed in claim 1, in which the solvent employed in step (6) consists essentially of solvent selected from the aromatic hydrocarbon compounds containing from 7 to 9 carbon atoms.

5. An improvement as claimed in claim 1, in which the polymer composition from which the dispersion is formed in step (6) is an elastomer composition having incorporated therein a filler material.

6. An improvement as claimed in claim 1, in which the polymer composition from which the dispersion is formed in step (6) is an elastomer composition having incorporated therein an inorganic filler material.

7. An improvement as claimed in claim 1, in which the polymer composition from which the dispersion is formed in step (6) is an elastomer composition having incorporated therein a siliceous filler material.

8. An improvement as claimed in claim 1, in which the polymer composition from which the solvent dispersion is formed in step (6) is a butyl rubber.

9. An improvement as claimed in claim 1, in which the polymer from which the solvent dispersion is formed in step (6) is an ethylene-propylene polymer.

10. An improvement as claimed in claim 1, in which the polymer from which the solvent dispersion is formed in step (6) is a diene polymer.

11. An improvement as claimed in claim 1, in which the polymer from which the solvent dispersion is formed in step (6) is a hydrocarbon polymer grafted with a polar graft.

12. An improvement as claimed in claim 1, wherein following step (10) the solvent is condensed from the gaseous phase and recycled to step (6).

13. An improvement as claimed in claim 1, in which in step (9) the phases are subjected to the decrease in pressure while in a combined turbulent flow.

14. An improvement as claimed in claim 1, in which the dispersion formed in step (6) consists essentially of polymer and filler material dispersed in the water immiscible solvent.

15. An improvement as claimed in claim 1, in which the dispersion formed in step (6) consists essentially of polymer and inorganic filler material dispersed in the water immiscible solvent.

16. An improvement as claimed in claim 1, wherein
  (a) in step (6) the solvent dispersion of polymer composition is formed in such proportions as to have a viscosity of at least 10,000 centipoises at room temperature, and wherein
  (b) step (7) is performed by mixing said solvent dispersion, water, and emulsifying agent, in proportions to form an oil-in-water emulsion, and reducing said mixture to an emulsion of precursor latex size particles by passing the same through a homogenizing apparatus.

17. A method as claimed in claim 16, in which in step (a) the dispersion is made in such proportions that it has a viscosity at room temperature of at least 20,000 centipoises.

18. In the formation of an aqueous latex from a solvent dispersion of high polymer composition, by a process of the type which comprises:
  (1) providing a dispersion of the polymer composition in volatile organic solvent,
  (2) adding water and emulsifier to said dispersion and emulsifying the same, and
  (3) stripping volatile organic solvent from the emulsion, and
  (4) recovering the resulting aqueous latex product, and in which
  (5) the emulsion being stripped of volatile solvent is dispersed in discontinuous phase with a moving body of vapor as the continuous phase while subjecting both phases to a decrease of pressure to vaporize the solvent, the improvement which consists in:
  (6) forming the solvent solution of the polymer composition with water immiscible solvent of boiling point lower than that of water or which forms an azeotrope with water that has a boiling point lower than that of water at atmospheric pressure,
  (7) adding to the so formed solution water and emulsifier in proportions to form an oil-in-water emulsion,
  (8) providing a moving flow of gas comprising steam as the initial continuous phase,
  (9) dispersing the oil-in-water emulsion of precursor latex partiles into the flow of steam as the initial continuous phase and thereafter subjecting both phases to the decrease of pressure referred to in step (5) while maintaining the temperature thereof below the limiting temperature for stability of the emulsion, thereby vaporizing solvent from the dispersed particles until substantially all the solvent is contained in the gaseous continuous phase,
  (10) separating the resulting particles of latex from the gaseous continuous phase,
  (11) concentrating the latex produced by step (10) by heating and dispersing it as a discontinuous phase with a continuous phase comprising a moving body of vapor evolved from its aqueous phase while subjecting the phases to gradually decreasing pressure and while maintaining both phases at temperatures within the limited range for stability of the latex, and while supplying heat to both phases as the pressure is decreased at a rate to maintain said temperature and volatilize water from the latex to concentrate the same and augment the vapor phase, and
  (12) separating the resulting concentrated latex from said vapor phase.

19. A process as claimed in claim 18 in which the latex produced by step (10) is concentrated nonevaporatively before being finally concentrated by step (11).

20. An improvement as claimed in claim 18, in which in step (9) the phases are subjected to the decrease in pressure while in a combined turbulent flow.

References Cited

UNITED STATES PATENTS

| | | |
|---|---|---|
| 3,277,037 | 10/1966 | Halper et al. |
| 2,403,966 | 7/1946 | Brown et al. |
| 3,244,660 | 4/1966 | Herold _____ 260—34.2 X |

FOREIGN PATENTS 951,166  3/1964  Great Britain.

SAMUEL H. BLECH, Primary Examiner

H. ROBERTS, Assistant Examiner

U.S. Cl. X.R.

260—4, 29.7, 33.6, 34.2, 41, 41.5, 819, 878, 879, 887, 892, 896